Dec. 22, 1953  R. GOUIRAND  2,663,569
PNEUMATIC SUSPENSION FOR VEHICLES
Filed May 19, 1948  5 Sheets-Sheet 1

INVENTOR.
RENE GOUIRAND
BY
Cornelius Zaluski
ATTORNEY

Dec. 22, 1953  R. GOUIRAND  2,663,569
PNEUMATIC SUSPENSION FOR VEHICLES
Filed May 19, 1948  5 Sheets-Sheet 2
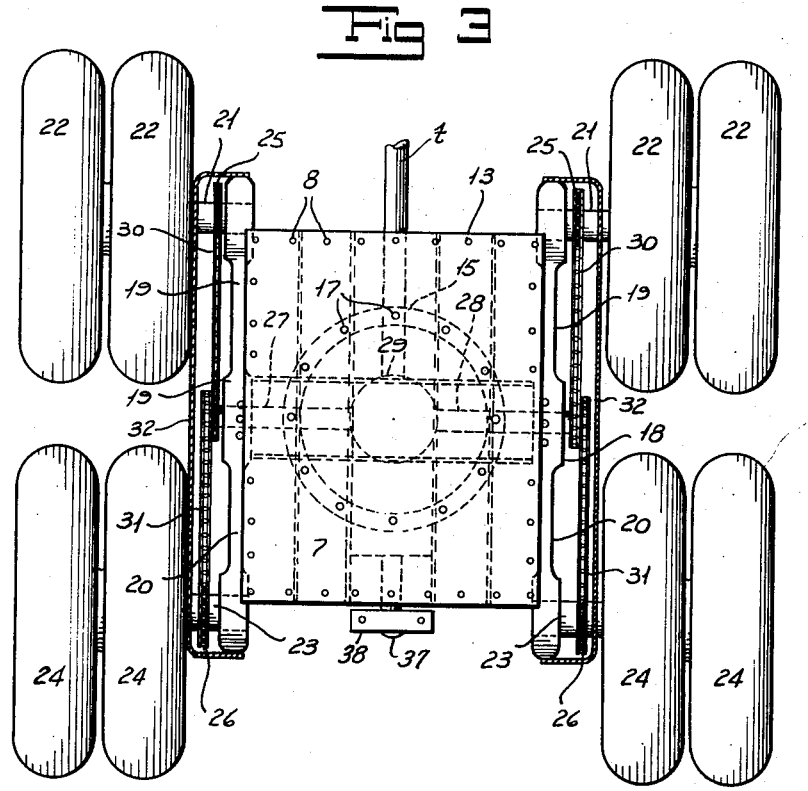
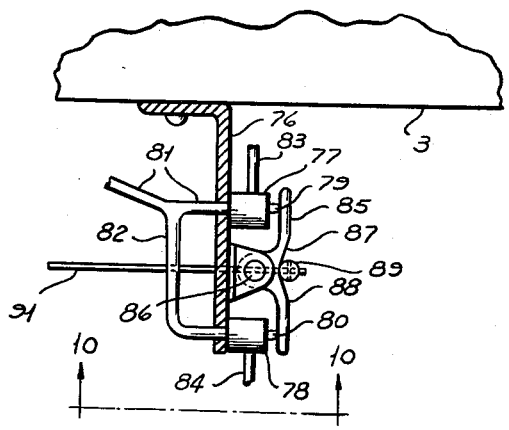
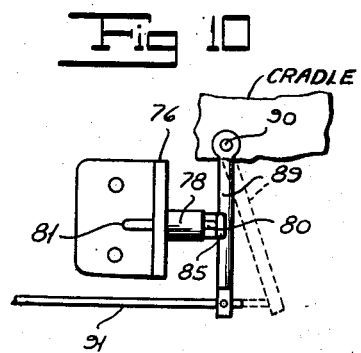
INVENTOR.
RENE GOUIRAND
BY
ATTORNEY Dec. 22, 1953 R. GOUIRAND 2,663,569
PNEUMATIC SUSPENSION FOR VEHICLES
Filed May 19, 1948 5 Sheets-Sheet 3
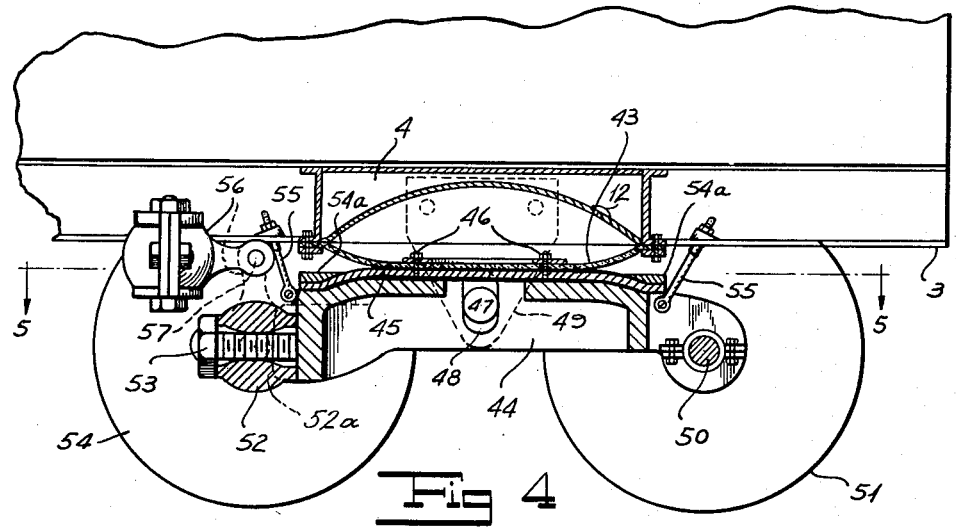
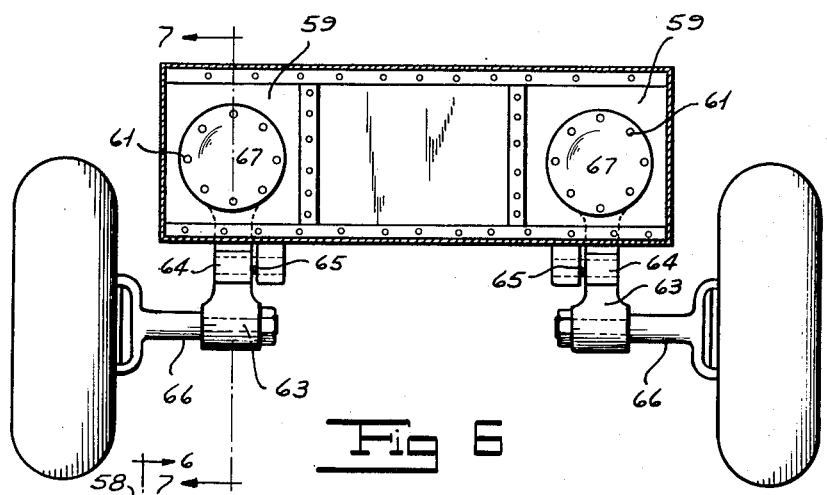
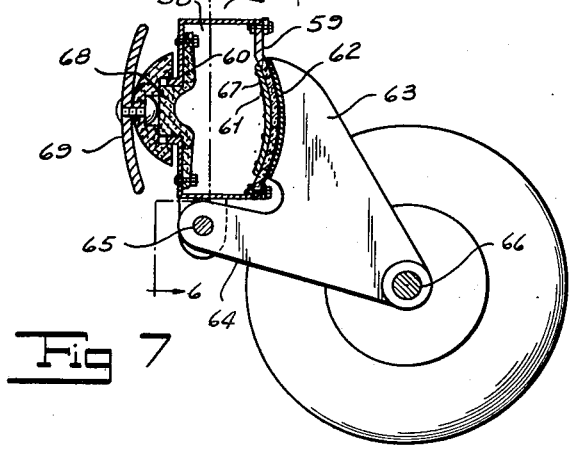
INVENTOR.
RENE GOUIRAND
BY
ATTORNEY

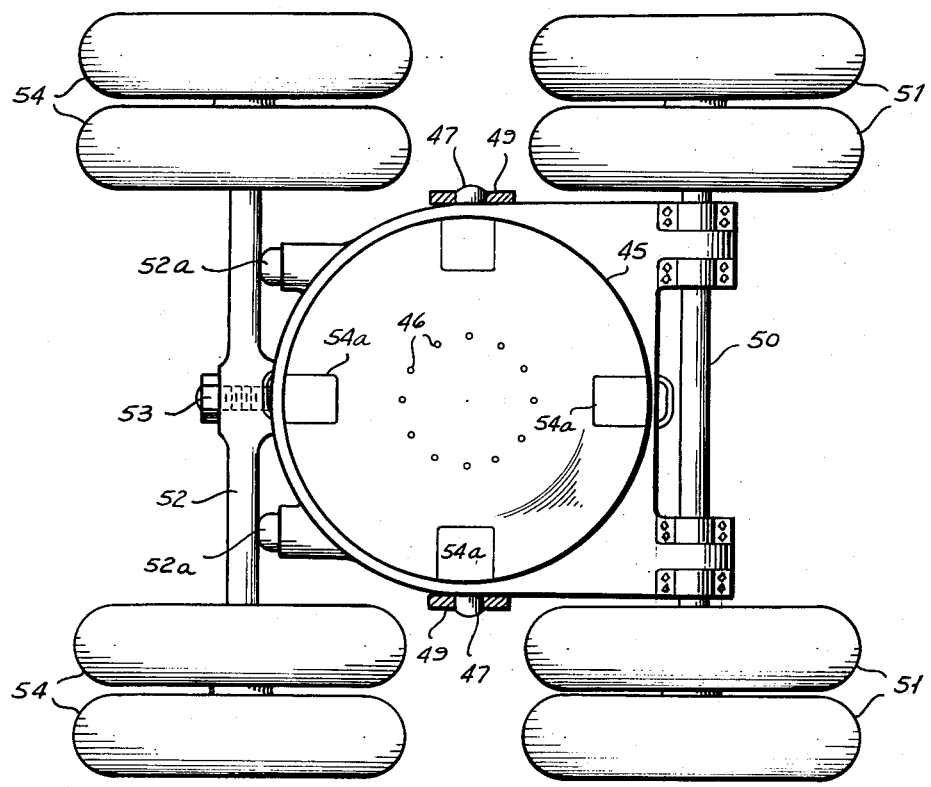
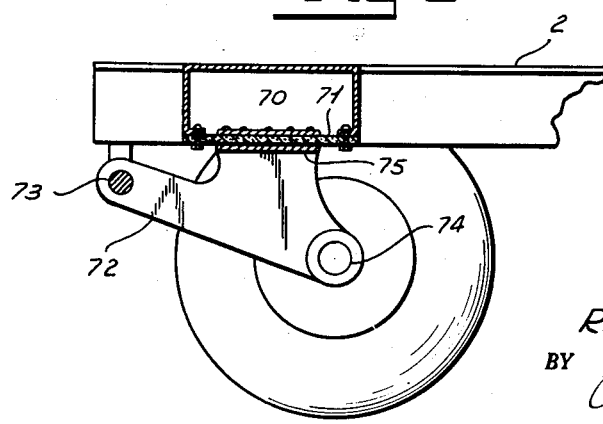

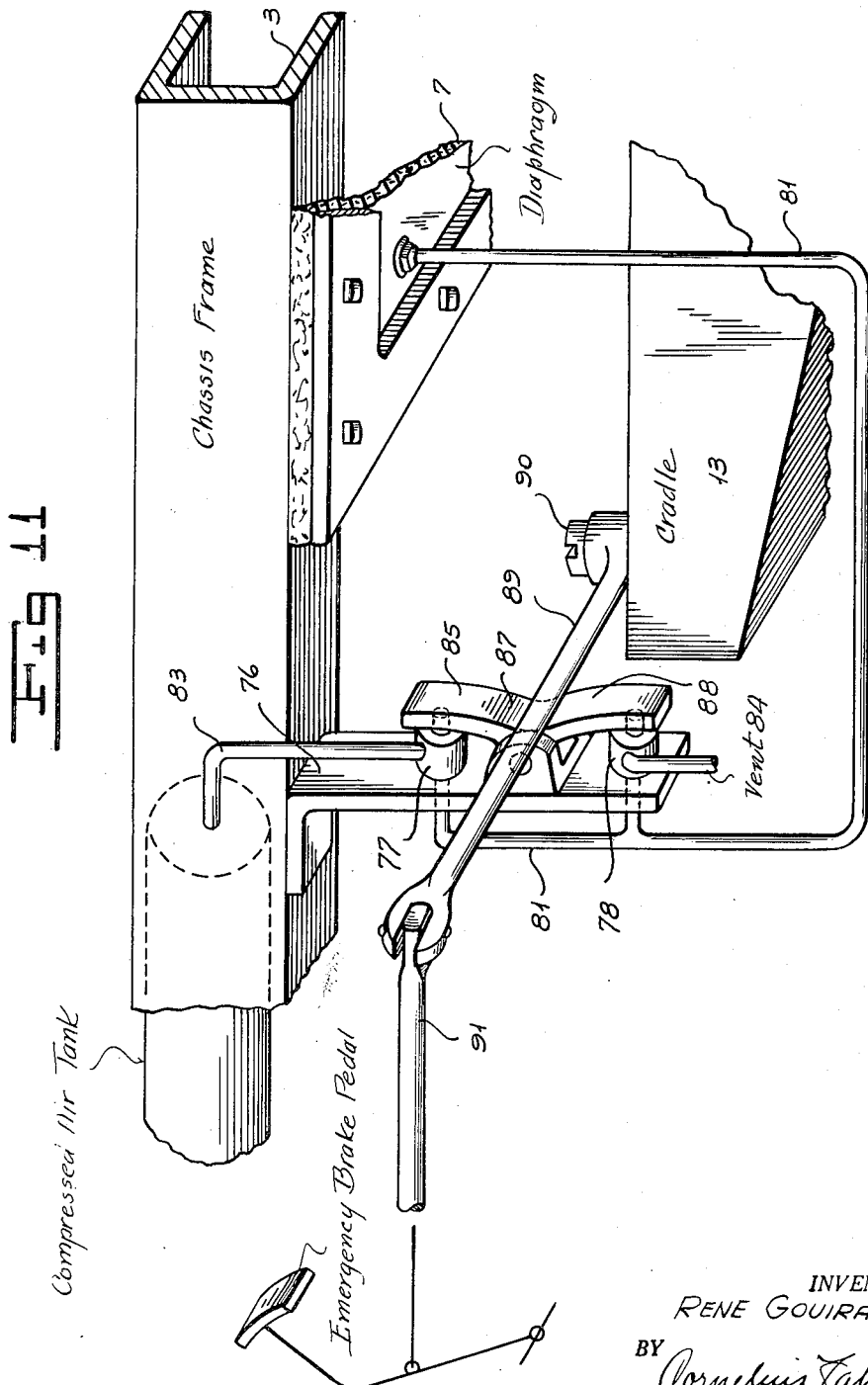

Patented Dec. 22, 1953

2,663,569

UNITED STATES PATENT OFFICE 2,663,569

PNEUMATIC SUSPENSION FOR VEHICLES

Rene Gouirand, New York, N. Y.

Application May 19, 1948, Serial No. 27,966

6 Claims. (Cl. 280—104.5)

1

This invention relates to pneumatic suspensions for vehicles, such as automobiles, trucks, trailers and the like, although certain of the constructions herein disclosed may be used to advantage on railway cars.

The primary object of the invention is to provide relatively simple, economical constructions adapted to support both light and heavy loads through the employment of pneumatic devices wherein the pressures employed may be effectually controlled in accordance with the load.

These objects, and others, are obtained through the use of the novel constructions hereinafter more particularly described and claimed.

The accompanying drawings illustrate different practical embodiments of the invention, but the constructions therein shown are to be understood as illustrative, only, and not as defining the limits of the invention.

Figure 1 is a rear view of a truck embodying the present invention with certain of the parts shown in vertical transverse section in the plane of the line 1—1 of Figure 2.

Figure 2 is a section in the plane of the line 2—2 of Figure 1.

Figure 3 is a plan section in the plane of the line 3—3 of Figure 1, showing the wheels in plan.

Figure 4 is a view similar to Figure 2, but showing a modified form of construction.

Figure 5 is a section on the line 5—5 of Figure 4 with the wheels in plan and certain attaching bolts or studs removed.

Figure 6 shows a modified form of suspension for the front end of the vehicle, this suspension being so constructed as to not only pneumatically suspend the chassis frame above the axle, but also to provide for a cushion for the bumper of the vehicle. This section is taken on the line 6—6 of Figure 7.

Figure 7 is a section on the line 7—7 of Figure 6.

Figure 8 is a vertical longitudinal section showing a further form of front axle suspension.

Figure 9 is a section partly in elevation of means for automatically controlling the pneumatic pressure in accordance with the load.

Figure 10 is an underneath plan view looking from the direction of the line 10—10 of Figure 9.

Figure 11 is a schematic view showing the manner in which air pressure within the cushioned chamber is adjusted to the desired pressure according to the load.

Referring first to Figures 1-3 of the drawings, 1 designates the body of the vehicle which is supported on a chassis frame 2 here shown as comprising two longitudinal frame members 3 of the channel cross section. Built into the rear portion of the chassis frame is a pneumatic chamber 4, closed on its front and back by plates 5 which extend between the side members 3 of the frame to form the end walls of the chamber. The top of the chamber is closed by a plate 6 and the bottom of the chamber is closed by a diaphragm 7 firmly secured in place by means of bolts 8, so that the chamber 4 is normally hermetically sealed. I preferably divide this chamber 4 by means of a rigid arcuate partition 9 into two sections 10 and 11 and in this partition 9 I provide a check valve 12 adapted to freely open to permit pressure to pass from the section 10 into the section 11 of the chamber and having formed in said check valve a constricted passage through which the pressure in the section 11 may slowly leak back into the section 10 to normally maintain, between said sections, a state of equilibrium of air pressure in both of them. I may use for this check valve a structure such as indicated at "55" in my Patent No. 2,488,288 of November 15, 1949.

The diagram 7 is preferably of flexible elastic material, such, for example, as vulcanized rubber in which is embedded cord or fabric to impart the necessary strength thereto. It is thus in the form of a plate of fairly heavy rugged construction firmly peripherally bolted to the under side of the chamber 4 by the bolts 8 and the pneumatic pressure within the chamber 4 reacts against the upper surface of this diaphragm to carry the weight imposed by the rear portion of the body and chassis frame.

Positioned below the diaphragm 7 is a cradle 13. This may be in the form of a casting or it may be fabricated from structural metal elements. It is provided with upstanding brackets 14 surmounted by a ring 15 bearing against the under side of the diaphragm 7 at some little distance from the periphery of said diaphragm. A ring 16, corresponding to the ring 15, is positioned against the upper surface of the diaphragm and bolts 17 pass through both rings 15 and 16 and through the interposed diaphragm to firmly secure the cradle to the diaphragm. These rings, however, leave the entire central portion of the diaphragm free to be flexed or bulged in both vertical directions as presently described and that portion of the diaphragm between the bolts 17 and 8 is also free to be similarly flexed or bulged, so that the attachment of the cradle does not materially affect the ability of the entire area of the diaphragm to flex or bulge.

Positioned midway of the length of the cradle and extending transversely thereof are two alined differential shafts 27 and 28 connected at their inner ends with differential gearing positioned within a differential housing 29 and these differential gears are adapted to be driven from the motor of the vehicle through a tail shaft t. The outer ends of each of the shafts 27 and 28 carry sprockets embraced by driven chains 30 and 31.

Mounted between the cradle and the sprockets on the differential shafts 27 and 28 are two rockers or yokes 18, one of which is positioned at each side of the cradle and both are of identical construction. Each rocker has a forwardly projecting arm 19 and a rearwardly projecting arm 20, the arms 19 and 20 of one rocker being parallel to the corresponding arms of the rocker. On the forward end of each of the arms 19 is a laterally projecting axial spindle 21, these two spindles being in axial alinement with one another and adapted to receive either single or dual wheels 22. At the rear ends of the arms 20 are similar axial spindles 23 adapted to carry single or dual wheels 24. The axial spindles 21 carry sprockets 25 and the spindles 23 carry sprockets 26. The sprockets 25 are embraced by the driven chains 30, while the sprockets 26 are embraced by the driven chains 31. The several wheels referred to are thus independently driven from the respective differential shafts while the rockers provide an independent suspension for the several spindles.

One important advantage of the structure of Figures 1–3 is that the wheels are independently driven, each through its own chain thereby giving great flexibility of drive while providing for the transmission of adequate power. The drive chains and sprockets may be enclosed within appropriate housings 32 which may be filled with lubricant so that the chains will run noiselessly and be thoroughly protected.

With the arrangement described, the weight of the after portion of the body and chassis frame will be imposed upon the cradle 13 through the diaphragm 7. The chamber 4 is adapted to contain compressed air to cushion the operations of the diaphragm 7. This air may be supplied from any suitable inlet from any appropriate source of supply, such as the compressed air tank on the vehicle. Sufficient pressure is maintained within the chamber to carry the load without undue flexing of the diaphragm 7, but this pressure is kept as low as possible commensurate with the load. Shocks transmitted from the road to the diaphragm are normally cushioned by the air in the section 10 of said chamber, although severe shocks may serve to momentarily unseat the check valve 12 against the tension of a spring which normally keeps it seated, so that air, under greatly increased pressure due to the shock, may escape to some extent into the chamber section 11, to slowly leak back through the check valve 12 and restore the state of equilibrium of pressure between these chambers after the shock is passed.

An important feature of the structure shown in Figures 1–3, inclusive, resides in the utilization of a portion of the chassis frame as walls of the pneumatic chamber for the side members 3 form the side walls of this chamber and separate chamber walls are not required for this purpose.

Another important feature of the structure of Figures 1–3 comprises the independent drive of the several sets of wheels through a common differential. This feature of the invention has been shown in these figures as including a pneumatic support in the form of the diaphragm 7, but in lieu of this diaphragm support, I may use, if desired, a pneumatic element, such as disclosed in my application Serial No. 678,605 filed June 22, 1946 and since issued as Patent Number 2,624,594 and position said pneumatic element between upper and lower bearers as therein illustrated. However, I prefer, for the sake of economy to use the diaphragm construction because of its lower manufacturing costs.

It is pertinent to note that, when the diaphragm is mounted, as shown in Figure 2, with its center unencumbered, road shocks which tend to increase the pressure of the air within the chamber 4 may be accompanied by a downward bulging of the central portion of the diaphragm which lies interiorly of the rings 15 and 17. This ability of the central portion of the diaphragm to bulge downwardly will also have a pronounced cushioning effect which will make the structure more easy riding than would be the case if the central portion of the diaphragm were backed up by a solid irresistable plate which would preclude such bulging.

The diaphragm 7 may, if desired, be made sufficiently strong to withstand driving and braking strains, as well as lateral sway of the chassis and truck body. However, to assist in taking up lateral sway and strains, as well as to act as snubbers, I preferably interpose, between the chassis frame 2 and cradle 13, cables or straps 33 and one or more cables or straps 34. The cables 33 are positioned at the opposite sides of the chassis frame with their lower ends anchored at 35 to the cradle and their upper ends adjustably secured by means of nuts acting on threaded cable terminals which pass through brackets 36 on the frame. The cable or cables 34 are similarly attached. In addition to these cables, the cradle may be provided with a rearwardly extending rod 37 projecting into an upright slot 38 in a bracket 39 arranged transversely of the frame. The slot 38 is of such height as to permit normal vertical movement of the cradle within the usual operating limits, but, in the event of severe shock in either vertical direction, this slot will act as a limiting slot, to protect the diaphragm from damage.

The cables and the limiting slot will serve the purposes for which they are intended in a satisfactory manner, but in order to keep the cables 33 taut under all conditions of load, I may provide, in the side members 3 of the frame, openings 40 communicating with the pressure chamber 4, as shown in Figure 1. Secured against the inner faces of the side members 3 to cover the openings are supplemental diaphragms 41 of rubber or other elastic material and to the centers of these diaphragms are secured the shanks of cable tensioners 42, adapted to bear against the cables 33 intermediate the ends of the latter. These supplemental diaphragms 41 and cable tensioners 42 will automatically compensate for the load of the vehicle. When a relatively light load is imposed on the vehicle, the main diaphragm disk 7 will be substantially flat and the spacing between the chassis frame and the cradle will be at its normal maximum. Therefore, the cables 33 will be substantially straight and will press against the tensioners 42 and thus bulge inwardly the supplemental diaphragms 41 against the pressure of air in the air chamber 4 which will keep these cables taut so that they are able to take up side sway. However, when the load on the chassis frame is increased, the main diaphragm 7 will be forced upwardly, increasing the pressure in the air chamber 4 and this air pressure will be exerted on the supplemental diaphragm 41 to force the tensioners 42 in an outward direction against the cables 33 and keep them taut, whereas they would otherwise become slack under these conditions.

The structures of Figures 4 and 5 are particularly intended for use for trailers for the drawings show no driving means associated with the wheels. However, driving means may be utilized if it is desired to use this arrangement to support the rear end of a truck. The structure of these figures also embodies many features which commend its use to railway trucks employing flanged wheels, instead of the rubber tires shown.

In the structure of these figures, the chassis frame is provided with the two compartment pneumatic chamber 4, as in the previous construction and a supporting diaphragm 43 forms the lower wall thereof. A cradle 44 is provided at its top with a plate 45 which underlies and is secured to the diaphragm 43 by bolts 46. From the opposite sides of the cradle extend transverse alined trunnions 47 which project through vertical slots 48 formed in vertical hangers 49 secured to and depending from the side members 3 of the chassis frame. The rear end of the cradle carries an axle 50 on which are mounted wheels 51 while to the forward end of the cradle, a transverse axle 52 is secured by means of a heavy stud 53 which passes centrally through the axle. This stud mounts the axle 52 for pivotal movement, so that, when the wheels 54 of the axle 52 pass over uneven ground, the axle may tilt about the axis of the stud 53 and thus minimize twisting strains on the cradle. Adjustable cables 55 act as snubbers and assist in taking up traction and braking strains. Guides 52a are mounted on the cradle back of the axle 52 and normally bear against the axle to protect the stud 53 against bending strains should the wheels 54 at one side of the vehicle strike an obstruction. These guides 52a may be rubber faced if desired. The upper surface of the plate 54 carries rubber bumpers 54a adapted to serve as cushions between this plate and the chassis frame in the event of severe vertical shock.

Mounted on the pivot 57 on the chassis frame forwardly of the cradle is a hanger 56. If, for any reason, it is desired to convert the two axle cradle of Figures 4 and 5 into one having a single axle, the stud 53 may be removed to release the axle 52 which may then be removed and the hanger 56 may be swung down and secured by the stud 53 to the forward end of the cradle to support it in elevated position, so that the cradle may function with only the back axle 50.

The structure of Figure 4, like the structures of Figures 1–3, discloses a diaphragm support although in lieu of such diaphragm, I may employ the cushion of my aforesaid application with upper and lower bearers, as hereinbefore specified, although the diaphragm is more economical to manufacture.

Figures 6 and 7 show one form of a front axle suspension for a vehicle. In this construction there is built into the forward end of the chassis frame a pneumatic cushioning chamber 58 which may extend entirely across the front of the vehicle ahead of the motor. The back face of this chamber has openings covered by two elastic diaphragms 59 while the front of the chamber has openings covered by two elastic diaphragms 60. Externally secured to the central portion of each of the diaphragms 59, by means of bolts or rivets 61, are plates 62 each of which is carried by one arm 63 of a bell crank, the other arm 64 of which is mounted on a fixed transverse fulcrum rod 65 on the chassis frame while the front spindle 66 is attached to the elbow of the bell crank, as shown best in Figure 7. If desired, the spindle may be made integral.

It is to be noted that the arm 63 of the bell crank is positioned somewhat below the center of the diaphragm 59. This eccentricity has been found desirable because of the greater movement of the upper portion of the bell crank than the lower portion thereof. With this type of mounting it will be noted that each of the front wheels is independently suspended.

A plate 67 is positioned on the inner face of each diaphragm 59, so that the bolts 61 may clamp the corresponding diaphragm between such plate and the plate 62 of the bell cranks. Each of the diaphragms 60 has a central boss 68 projecting through one of the openings in the front wall of the pneumatic chamber 58 and to these bosses is secured the transverse bumper 69 of the vehicle. Compressed air within the chamber 58 thus serves not only to cushion the operations of the front axle or front axle spindles as the case may be, but also serves as a cushion for the bumper 69.

In the structure of Figure 8, a pneumatic chamber 70 is built into each side of the forward portion of the chassis frame and its lower end is closed by an elastic diaphragm 71. A lever 72 is pivoted at its forward end to a fixed fulcrum 73 on the chassis frame. The rear end of each lever carries a front axle or spindle 74 while intermediate the ends of each lever it is provided with a plate 75 bolted to the elastic diaphragm 71. With this construction each front wheel has an independent suspension and the pneumatic chamber for each front wheel is built into the chassis frame for the sake of economy and compactness of structure.

It will of course be understood that the several pneumatic chambers utilized in the structures which I have described, are supplied with compressed air under adequate pressure from any suitable source. Such source may conveniently be in the form of a tank in which air under relatively high compression is supplied from a pump or storage tank. The air may be fed from the storage tank to the respective pneumatic chambers through any suitable controls, but I have shown in Figures 9 and 10 a very simple and effective means for maintaining the air in these pneumatic chambers at optimum pressure appropriate to the particular load to be carried thereby. The mechanism therein shown may control any or all the pneumatic chambers. Let us assume, for example, that Figures 9, 10 and 11 are intended to control the air pressure in the pneumatic chamber 4 of the structures of Figures 1–3. In that event, a depending bracket 76 is shown as mounted on one of the side members 3 of the chassis frame. On this bracket are secured two valves 77 and 78 positioned one above the other, said valves being respectively operable by valve stems 79 and 80, which, when pushed in will open the valve. The upper valve 77 is connected by a pipe 81 to the pneumatic chamber to be controlled while a branch pipe 82 leads to the valve 78. The valve 77 has a pipe connection 83 with the storage tank containing compressed air, while the valve 78 has a vent 84 to the atmosphere.

Mounted on a pivot 86 between the two valves is a rocker 85. This rocker has two cam surfaces 87 and 88 with which cooperates a normally rigid stop lever 89, pivoted at 90 on the cradle 13. A manually operable rod 91 extends forwardly and is connected to the hand or emergency brake, so that, when the brake is set, the stop lever 89 will be moved into and held rigidly within the full line position shown in Figure 10. When the brake is released the lever 89 will be retracted into the dotted line position of that figure. When in the full line position shown in Figure 9, it will lie between the cam surfaces 87 and 88, this position being appropriate for a normal loading of the vehicle. If a greater load is placed on the vehicle, this load will lower the body and chassis frame and will require greater pressure in the pneumatic chamber to properly support the load.

However, as the chassis frame is lowered, it carries downwardly with it the bracket 76 and the rocker 85 with the result that the cam surface 87 coacts with the stop lever 89 to tilt the rocker in an anticlockwise direction thereby pressing in the valve stem 79 to open the valve and admit pressure from the storage tank into the pipe line 81 which leads to the pneumatic chamber. This will cause the pressure in that chamber to be built up to a point wherein it will properly support the load and in so doing lift the body sufficiently to restore the parts to the position shown in Figure 9, whereupon the feed of compressed air to the chamber will be discontinued.

When a sufficient portion of the load is removed to require a lesser pressure in the pneumatic chamber, the elevation of the bracket 76 will cause a tilting of the rocker 85 in a clockwise direction to open the valve 78 and vent the pneumatic chamber until the equilibrium shown in Figure 9 is restored. This automatic control is intended to function during loading and unloading operations of trucks and trailers, so as to maintain substantially uniform body level at these times.

When the lever 89 is in the retracted dotted line position of Figure 10, it will be moved entirely out of the path of the rocker 85, so that the cam surfaces 87 and 88 will not engage with said lever as the body of the vehicle is raised and lowered under different loadings and consequently the valves 77 and 78 will no longer be responsive to or automatically compensate for different loadings.

The foregoing detailed description sets forth the invention in its preferred practical forms, but the invention is to be understood as fully commensurate with the appended claims.

Having thus fully described the invention, what I claim as new and desire to secure by Letters Patent is:

1. A vehicle comprising: a chassis frame, a portion of which is partitioned off from the remainder to provide therein a pneumatic chamber having lateral walls and closed at its bottom by an elastic diaphragm, a wheeled cradle positioned beneath the diaphragm and secured thereto, tension members connecting the cradle and the chassis frame to act as snubbers and to limit side sway, the lateral walls of the pneumatic chamber being apertured, supplemental diaphragms interiorly covering said apertures, and tensioning elements bearing against the supplemental diaphragms and extending through said apertures into engagement with the tension members to maintain said members taut under varying loads.

2. A vehicle comprising: a body, a pneumatic chamber carried by the body and the bottom of which chamber is closed by an elastic diaphragm peripherally secured to the walls of the chamber, a wheeled cradle positioned beneath said diaphragm, means for securing the diaphragm to the cradle in spaced relation to the periphery of the diaphragm and in spaced relation to the central portion of the diaphragm, the central portion of the cradle being vertically spaced from the central portion of the diaphragm and said central portion of the diaphragm being vertically spaced from the top of the chamber and free from contact with rigid surfaces and exposed to the air pressure within the pneumatic chamber whereby it is free to be flexed in both directions perpendicular to its plane of normal loading.

3. A vehicle as claimed in claim 2, wherein the securing means comprises a bottom ring carried by the cradle and engaging the under side of the diaphragm and a concentric ring overlying the diaphragm and secured through the diaphragm to the bottom ring.

4. In a vehicle having an emergency brake system and a pneumatic suspension chamber interposed between the vehicle body and a wheeled carrying member and wherein compressed air is supplied to the suspension chamber through an air line, the improvement which comprises: a valve in said air line, a second valve for venting said chamber to the atmosphere, and a rocker having opposed cam faces and operable to selectively open said valves, said valves and rocker being mounted on the body, a cam follower mounted on the wheel carrying member and movable into and out of cooperation with the rocker, said cam follower being connected to the emergency brake system of the vehicle and movable thereby into cooperative relation with the rocker when the emergency brake system of the vehicle is in condition to brake the vehicle.

5. In a vehicle having an emergency brake system and a pneumatic suspension chamber interposed between the vehicle body and a wheeled carrying member and wherein compressed air is supplied to the suspension chamber through an air line, the improvement which comprises: a normally closed valve in the air line to permit admission of compressed air into the chamber, a normally closed valve to vent said chamber, a valve controlling member common to both valves with means on said controlling member for selectively controlling both valves, said valves and the valve controlling member being mounted on the body and the wheeled carrying member respectively, and connections between the braking system and the valve controlling member to render the latter operative upon the valves only when said system is conditioned to brake the vehicle.

6. A vehicle comprising: a chassis frame, a vehicle body mounted on said frame, a pneumatic chamber built into the chassis frame below the body and extending transversely of the frame and having rigid top, end and side walls and an open bottom, a horizontally disposed elastic diaphragm extending transversely of the frame and beneath the body and peripherally secured to the end and side walls of the chamber to close the open bottom of the latter, and a wheeled cradle beneath the frame and anchored to the diaphragm.

RENE GOUIRAND.

References Cited in the file of this patent

UNITED STATES PATENTS

| Number | Name | Date |
| --- | --- | --- |
| 1,414,623 | Church | May 2, 1922 |
| 1,555,199 | Gouirand | Sept. 29, 1925 |
| 1,850,942 | Rockwell | Mar. 22, 1932 |
| 2,070,719 | Eisin | Feb. 16, 1937 |
| 2,071,480 | Williams | Feb. 23, 1937 |
| 2,115,158 | Dupuy et al. | Apr. 26, 1938 |
| 2,361,575 | Thompson | Oct. 31, 1944 |
| 2,367,151 | Stephen | Jan. 9, 1945 |
| 2,403,833 | Spangler | July 9, 1946 |
| 2,488,288 | Gouirand | Nov. 15, 1949 |
| 2,492,126 | Collender | Dec. 20, 1949 |

FOREIGN PATENTS

| Number | Country | Date |
| --- | --- | --- |
| 130,159 | Great Britain | July 25, 1919 |